United States Patent [19]

Sianesi et al.

[11] Patent Number: 5,149,842
[45] Date of Patent: Sep. 22, 1992

[54] PROCESS FOR PREPARING PEROXIDE PERFLUOROPOLYETHERS

[75] Inventors: Dario Sianesi, Milan; Antonio Marraccini, Dormelletto; Giuseppe Marchionni, Milan, all of Italy

[73] Assignee: AUSTIMONT S.r.l., Milan, Italy

[21] Appl. No.: 613,483

[22] PCT Filed: Apr. 20, 1990

[86] PCT No.: PCT/EP90/00638
§ 371 Date: Oct. 31, 1990
§ 102(e) Date: Oct. 31, 1990

[87] PCT Pub. No.: WO90/12832
PCT Pub. Date: Nov. 1, 1990

[30] Foreign Application Priority Data

Apr. 20, 1989 [IT] Italy ............... 20207 A/89

[51] Int. Cl.$^5$ ................. C07D 301/06; C07D 303/08; C08F 2/46; C07C 179/00
[52] U.S. Cl. ................. 549/550; 204/157.69; 204/4 M; 549/532; 568/560
[58] Field of Search ......... 549/532, 550; 560/560; 204/157.69, 159.22

[56] References Cited

U.S. PATENT DOCUMENTS

| 3,392,097 | 7/1960 | Gozzo et a. | 549/550 |
| 3,451,907 | 6/1969 | Sianesi et al. | 204/157.69 |
| 3,622,601 | 11/1971 | Dale | 549/550 |
| 3,639,429 | 2/1972 | Weinmayrz | 549/532 |
| 3,650,928 | 3/1972 | Sianesi et al. | 568/560 |
| 3,704,214 | 11/1972 | Sianesi et al. | 204/157.69 |
| 3,715,378 | 2/1973 | Sianesi et al. | 204/157.92 |
| 3,847,978 | 11/1974 | Sianesi et al. | 549/550 |
| 4,384,128 | 5/1983 | Krespan et al. | 549/532 |

*Primary Examiner*—Joseph E. Evans
*Attorney, Agent, or Firm*—Stevens, Davis, Miller & Mosher

[57] ABSTRACT

A process is disclosed for preparing peroxidic perfluoropolyethers comprising perfluoroalkylenoxy units having at least two carbon atoms, characterized in that one or more perfluoroolefins, except tetrafluoroethylene used alone, are reacted with oxygen in the liquid phase at a temperature not exceeding 50° C. and in the presence of one or more compounds having one or more F-X bonds, in which X is selected from the group consisting of F, O and Cl.

32 Claims, No Drawings

PROCESS FOR PREPARING PEROXIDE PERFLUOROPOLYETHERS

The present invention relates to a process for the preparation of peroxidic perfluoropolyalkylenoxy compounds, more commonly referred to as peroxidic perfluoropolyethers.

In particular, the present invention relates to a process for preparing peroxidic perfluoropolyethers comprising perfluoroalkylenoxy units having at least two carbon atoms. These compounds are prepared, according to the art, by reacting perfluoroolefins with oxygen under irradiation with ultraviolet light.

This technique exhibits the drawback of being delicate and complex, as it requires the use of ultraviolet radiation generators and of reactors of suitable construction in order to permit the radiation to penetrate and to spread inside the reacting phase. Furthermore, since these reactions are usually conducted at very low temperatures, even lower than $-50°$ C., it is necessary to have available efficient means of eliminating the heat associated with the generation of the ultraviolet radiation. Moreover, the reaction yield and the product structure are strongly affected by the amount and distribution of the radiation inside the reaction medium, which considerably limits the desired production flexibility provided by a given reactor.

U.S. Pat. No. 4 460 514 relates to the preparation of non-peroxidic oligomers of $(CF_2O)$ having a $-CF_2-COF$ end group. These oligomers are useful for the preparation of s-triazines with perfluoroxymethylene substituent groups. In example IIa, perfluoro-3-methylbutene-1, $CF_2=CF-CF(CF_3)_2$, is reacted, in the gas phase, with oxygen in the presence of $CF_3OF$ without the use of ultraviolet radiation, which affords, at the end of the reaction, the unreacted olefin, $(CF_3)_2CF-CFO$ and a small amount of non-peroxidic oligomers of $(CF_2O)$ having a $CF_2-COF$ end group.

It has now, surprisingly, been found that the preparation of peroxidic perfluoropolyethers comprising perfluoroalkylenoxy units having at least two carbon atoms may be effected without the use of ultraviolet radiation if the perfluoroolefins are reacted, in the liquid phase, with oxygen in the presence of particular reagents.

It is, thus, an object of the present invention to provide a process which affords peroxidic perfluoropolyethers comprising perfluoroalkylenoxy units having at least two carbon atoms without using ultraviolet radiation or using UV-irradiation only as complementary measure.

Another object is to provide a process which is simple, can be carried out in apparatus commonly used in the field of chemical processes and can be controlled simply by regulating the amount of reagents introduced in the course of the reaction.

A further object is to provide a very flexible process which permits to obtain, by varying the operative modalities, a wide range of products with different structural characteristics.

Still another object is to provide a process which results in peroxidic perfluoropolyethers having a very low ratio of $-COF$ end groups to non-functional end groups.

These and still further objects are achieved by the process according to the present invention for preparing peroxidic perfluoropolyethers comprising perfluoroalkylenoxy units having at least two carbon atoms.

This process is characterized in that one or more perfluoroolefins (except tetrafluoroethylene used alone) are reacted with oxygen in the liquid phase at a temperature not exceeding 50° C. and in the presence of one or more compounds having one or more F—X bonds, in which X is selected from the group consisting of F, O and Cl.

In particular, when X is oxygen, said compound is an oxygen fluoride or an organic compound containing one or more fluoroxy groups. More usually, it is a perhalogenated alkyl or alkylene compound (the halogen atoms of which being F atoms or F and Cl atoms), containing one or more fluoroxy groups and, optionally, one or more heteroatoms, in particular oxygen atoms.

Said compound usually contains one or two fluoroxy groups. Preferably it is a perfluorinated compound; when it is a perhalogenated compound containing F and Cl atoms, the number of Cl atoms present in the molecule generally range from 1 to 10. The heteroatoms, if present, preferably are ether oxygen atoms. The number of said heteroatoms in the molecule generally ranges from 1 to 100 and, more usually, from 1 to 10.

When X is F, the compound is $F_2$. When X is Cl, the compound is a chlorine fluoride.

In the following, the compounds having one or more F—X bonds will be referred to as initiators, the use of this term being, however, not binding for the characterization of the reaction mechanism.

It cannot be excluded that a significant amount of reaction initiators may actually be formed in the reaction medium, due to the action exerted by the substances containing one or more F—X bonds on the components of the reaction medium and the products of the reaction, i.e. $O_2$, fluoroolefins, peroxide bonds and carbonyl bonds.

Examples of preferred initiators are:
1) $F_2$;
2) $R^5-OF$, wherein $R^5$ is a $C_{1-10}-$, preferably $C_{1-3}-$perhaloalkyl radical containing only fluorine atoms or containing fluorine atoms and from 1 to 5 chlorine atoms. Preferably, $R^5$ is a perfluoroalkyl radical;

3) 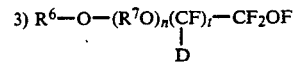

wherein:
D represents F or $CF_3$;
t is zero or 1;
$R^6$ is a $C_{1-3}$-perfluoroalkyl radical or a $C_{1-3}$-perhaloalkyl radical containing fluorine atoms and (one or more, preferably one) chlorine atom(s): preferably $R^6$ is a perfluoroalkyl radical; $R^7$ represents one or more perfluoroalkylene radicals, the same or different from one another, selected from

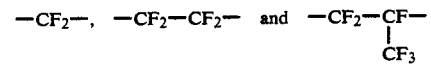

and n ranges from 0 to 50, preferably from 0 to 3; (frequently n ranges from 1 to 10 and, more commonly, from 1 to 3); when different units (R$^7$O) are present, these units are statistically distributed along the chain;

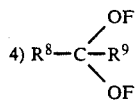

4) $R^8—C\begin{smallmatrix}OF\\OF\end{smallmatrix}R^9$ wherein R$^8$ is F or a C$_{1-9}$-, preferably C$_{1-3}$-perhaloalkyl radical containing F atoms or F atoms and from one to three Cl atoms; preferably R$^8$ is F or a perfluoroalkyl radical; R$^9$ is F, R$^8$ or a perfluoroalkylmonoether or perfluoroalkylpolyether group R$^6$O—(R$^7$O)$_n$—$_{CF_2}$—, in which R$^6$, R$^7$ and n are as defined above;

5) FO—(R$^7$O)$_s$—F wherein R$^7$ is as defined above and s ranges from 1 to 100, preferably 1 to 10, provided that, when R$^7$ represents —CF$_2$—, s has a value higher than 1; 6) FO—(CF$_2$)$_v$—OF, wherein v ranges from 3 to 5.

Usually, the starting perfluoroolefins are selected from:
(a) one or more perfluoromonoolefins, provided that C$_2$F$_4$ is always employed in admixture with at least one other perfluoroolefin;
(b) a perfluorodiolefin;
(c) a perfluorodiolefin in combination with one or more monoolefins;
(d) one or more perfluoromonoolefins in combination with one or more perfluorovinylethers.

Usually, the starting perfluoromonoolefin or perfluoromonoolefins contain from 2 to 5, preferably from 2 to 4 carbon atoms. Preferred perfluoromonoolefins are hexafluoropropene, as such or in admixture with tetrafluoroethylene.

The preferred starting perfluorodiolefin is perfluorobutadiene.

Generally, the starting perfluorovinylethers have the general formula:

$$CF_2 = CF—O—R^2$$

wherein:
R$^2$ is (R$^3$O)$_m$R$^4$ or R$^4$;
R$^3$ is selected from the group consisting of —CF$_2$—,

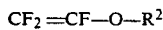

—CF$_2$—CF$_2$— and —CF$_2$—CF—;
                              |
                             CF$_3$ R$^4$ is a perfluoroalkyl group selected from linear groups containing from 1 to 10 carbon atoms, branched groups containing from 3 to 10 carbon atoms and cyclic groups containing from 3 to 6 carbon atoms; and m ranges from 1 to 6, particularly from 1 to 3.

Preferably R$_2$ is R$_4$. R$_4$ is, preferably, selected from CF$_3$, C$_2$F$_5$, n- and i-C$_3$F$_7$ and n-, i- and tert-C$_4$F$_9$.

Usually, into a liquid phase comprising a solvent and/or one or more perfluoroolefins, there are introduced a gaseous stream of oxygen, a gaseous or liquid stream of initiator or initiators and, optionally, a gaseous or liquid stream of one or more perfluoroolefins, the last-mentioned stream always being present if the liquid phase does not contain perfluoroolefins prior to the start of the reaction.

Instead of feeding the initiator or initiators in the form of a gaseous or liquid stream into the liquid phase, it is possible to introduce said initiator(s) into the liquid phase before the commencement of the reaction. This procedure can be employed, for example, when the initiator(s) is (are) liquid at room temperature.

Preferably, also an inert gas is introduced into the liquid phase. Said inert gas usually is fed in admixture with the initiator(s) if said compound(s) is (are) added to the liquid phase in the form of a gaseous stream. The inert gas can also be employed, in part or as a whole, in combination with the oxygen. In other words, instead of oxygen, it is possible to use mixtures of oxygen and inert gases, in particular air.

The streams of oxygen, gaseous initiator(s) and inert gas can be introduced into the liquid phase in the form of mixtures of two or more components.

The minimum temperature at which the liquid phase is maintained during the reaction is such that the component or components of said phase are in the liquid state. Generally, the reaction temperature ranges from −120° to +50° C., more usually from −100° to +25° C. and particularly from −100° to +20° C. The most preferred reaction temperatures range from −100° to 0° C.

The solvent, when used, preferably is selected from linear and cyclic fluorocarbons, chlorofluorocarbons, perfluoroamines, perfluorinated ethers and mixtures thereof.

Examples of suitable fluorocarbons or chlorofluorocarbons are CFCl$_3$, CF$_2$Cl$_2$, cyclo-C$_4$F$_8$, cyclo-C$_6$F$_{12}$, chloropentafluoroethane, 1,1,2-trichloro-1,2,2-trifluoroethane, 1,2-dichlorotetrafluoroethane and 1,1,1-trifluorotrichloroethane.

Examples of suitable perfluoroamines are those sold under the designation Fluorinert$^{(R)}$ (produced by 3M).

Examples of suitable perfluorinated ethers are the perfluoropolyethers having perfluoroalkyl end groups and a boiling point lower than 250° C. such as Galden$^{(R)}$, produced by Montefluos.

The inert gas, when employed, preferably is selected from nitrogen, argon, helium, CF$_4$, C$_2$F$_6$ and mixtures thereof.

Into the liquid phase oxygen is continuously introduced at a partial oxygen pressure in the reactor generally ranging from 0.01 to 10 atmospheres and, more usually, from 0.05 to 1 atmosphere.

The total pressure of the reaction medium generally ranges from about 1 to 10 atmospheres/abs. More usually, the reaction is carried out at about atmospheric pressure.

The concentration of the perfluoroolefin or perfluoroolefins in the liquid phase generally ranges from 0.01 to 10 moles/liter and more, i.e., up to the molar concentrations of the perfluoroolefin or perfluoroolefins in the pure (undiluted) state.

When the initiator or initiators are continuously fed into the liquid phase in the gaseous or liquid state, the flow rate thereof generally ranges from 0.001 to 5 moles per hour per liter of liquid phase and, more usually, from 0.01 to 2 moles per hour per liter of liquid phase.

If the initiator or initiators are introduced into the liquid phase prior to the start of the reaction, the molar ratio:

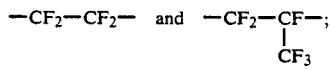

$$\frac{\text{initiator(s)}}{\text{total of introduced perfluoroolefin(s)}}$$

generally ranges from 0.01 to 0.1.

At the end of the reaction, for example after 0.1 to 20 hours, the reagent feed is discontinued. The solvent, if any, and the unreacted monomer(s) are removed, preferably by distillation, and the peroxidic perfluoropolyether is obtained as residue in the form of an oily liquid or a semi-solid material.

The reaction can also be conducted in a fully continuous manner, by continuously withdrawing a liquid phase portion from the reactor, subjecting it to distillation, recycling the solvent, if any, and the unreacted monomer(s) and recovering the reaction product.

The resulting peroxidic perfluoropolyethers comprise perfluoroalkylenoxy units having at least two carbon atoms. This means that they never consist only of units ($CF_2O$) but that, besides such units, there are always present the usual perfluoroalkylenoxy units having 2, 3 and more carbon atoms such as $$(CF_2-CF_2O), \quad (CF-CF_2O), \text{ etc.,}$$
$$\qquad\qquad\qquad\ \ |$$
$$\qquad\qquad\qquad CF_3$$

which units may be obtained by reacting perfluoroolefins with oxygen under the action of ultraviolet radiation according to the state of the art, as will be discussed below.

The molar concentration of perfluoroalkylenoxy units having at least two carbon atoms in the obtained perfluoropolyethers generally ranges from 50 to 99.9% and, more usually, from 70 to 99%. The process of the present invention usually affords peroxidic perfluoropolyethers having a very low ratio, generally lower than 25% of —COF end groups to non-functional end groups.

The number average molecular weight of the products obtained generally ranges from a few hundred to several hundred-thousands, for example 300000. More usually, it ranges from 500 to 100000.

The amount of peroxidic oxygen in the products obtained generally ranges from 0.1 to 9 grams per 100 grams of product.

As is known, the obtained peroxidic perfluoropolyethers may be used as radical polymerization initiators and as crosslinking agents for polymers, in particular, for fluorinated polymers. By means of known methods, they can be converted into inert perfluoropolyethers (i.e., free of peroxide groups and reactive end groups) which are widely used as inert fluids for various applications; for example, for testing in the electronic sector, welding in the vapour phase and in the liquid phase, protection of building materials, lubrication, etc.

The peroxidic perfluoropolyethers obtained are also precursors of functional perfluoropolyethers which are useful, for example, as surfactants and intermediates for polymers.

After elimination of the peroxidic groups, the perfluoropolyethers obtained may be subjected to a cleavage process, for example, by means of heating in the presence of catalytic amounts of $AlBr_3$ or $AlF_3$, as described in U.S. Pat. No. 4,755,330. In this manner, products having a considerably lower average molecular weight than that of the starting materials may be obtained.

Molecules free of peroxidic oxygen may, of course, be present in the mixtures of polymer molecules obtained through the process of the present invention.

When a mixture of tetrafluoroethylene and hexafluoropropene is used as starting material, the following products may be obtained:

$$A-O-(CF_2O)_{a1}(CF_2-CF_2O)_{d1}(CF_2-CFO)_{b1}(CFO)_{c1}(O)_{e1}-B \quad (I)$$
$$\qquad\qquad\qquad\qquad\qquad\qquad\qquad\qquad\qquad\quad |\qquad\ \ |$$
$$\qquad\qquad\qquad\qquad\qquad\qquad\qquad\qquad\quad CF_3\ \ CF_3$$

wherein:
A and B are end groups, which will be defined below,
a1 = 0 –5000
b1 = 0 –1000
c1 = 0 –100
d1 = 0 –5000
e1 = 1 –1000
b1+c1+d1 = 1–5000 and, more usually, 4–2000

$$\frac{a1}{b1+c1+d1} = 0.001-1 \text{ and, more usually, } 0.01-0.45$$

$$\frac{e1}{a1+b1+c1+d1} = 0.01-0.9$$

When perfluoropropene alone is used as starting perfluoroolefin, products having the following formula may be obtained:

$$A-O-(CF_2O)_{a5}(CF_2-CFO)_{b5}(CFO)_{c5}(O)_{e5}-B \quad (V)$$
$$\qquad\qquad\qquad\qquad\qquad\ \ |\qquad\ \ |$$
$$\qquad\qquad\qquad\qquad\quad CF_3\ \ CF_3$$

wherein:
a5 = 0–100 and, more usually, 0–50
b5 = 1–1000 and, more usually, 1–500
c5 = 0–100 and, more usually, 0–50
e5 = 1–1000 and, more usually, 1–300
a5+b5+c5 = 2–1000 and, more usually, 2–500
a5+c5/b5 = 0.001–100 and, more usually, 0.01–50
a5/b5+c5 = 0.001–1 and, more usually, 0.01–0.45
e5/a5+b5+c5 = 0.01–0.5.

When perfluorobutadiene alone is used as starting perfluoroolefin, products having the following formula may be obtained:

$$A-O-(CF_2O)_{a2}(CF_2-CFO)_{g2}(CFO)_{h2}(CF_2-Z-CF_2)_{j2}(O)_{e2}-B \quad (II)$$
$$\qquad\qquad\qquad\qquad\qquad\ \ |\qquad\quad |$$
$$\qquad\qquad\qquad\qquad\quad R^1\quad\ \ R^1$$

wherein:
$R^1$ is $$-CF\!\!-\!\!-CF_2$$
$$\quad\ \backslash\ /$$
$$\quad\ \ O$$

and/or $-CF = CF_2$ and/or $-CF_2-COF$ and/or —COF;

Z is $-CF = CF-$ and/or $$-CF\!\!-\!\!-CF-$$
$$\quad\ \backslash\ /$$
$$\quad\ \ O$$

a2 = 0–100
g2 = 1–1000
h2 = 0–100
j2 = 0–1000
e2 = 1–1000
g2+h2+j2 = 1–1000 and, more usually, 2–500
a2+g2+h2+j2 = 2–1000 and, more usually, 2–500

$$\frac{e2}{a2 + g2 + h2 + j2} = 0.01 - 0.5$$

When perfluorobutadiene and tetrafluoroethylene and/or perfluoropropene are used as starting perfluoroolefins, products having the following formula may be obtained:

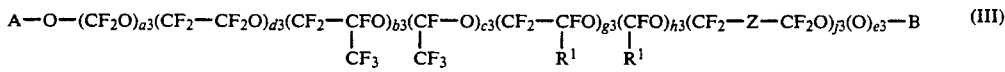

wherein $R^1$ and Z are as defined above
a3 = 0–1000
b3 = 0–1000
c3 = 0–100
d3 = 0–1000
g3 = 1–1000
h3 = 0–100
j3 = 0–1000
e3 = 1–1000
a3+b3+c3+d3 =1–1999 and, more usually, 2–1000
g3+h3+j3 =1–1000 and, more usually, 1–500
a3+b3c3+d3+g3+h3+j3=2–2000 and, more usually, 3–1000

$$\frac{g3 + h3 + j3}{a3 + b3 + c3 + d3} = 0.01-100 \text{ and,}$$

more usually, 0.1–100

$$\frac{e3}{a3 + b3 + c3 + d3 + g3 + h3 + j3} = 0.01-0.5$$

When one or more perfluorovinylethers of formula $CF_2=CF-OR^2$ and tetrafluoroethylene and/or hexafluoropropene are employed, products having the following formula may be obtained:

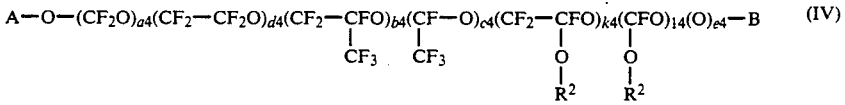

wherein:
$R^2$ is as defined above
a4 = 0–1000
b4 = 0–1000
c4 = 0–100
d4 = 0–1000
k4 = 0–1000
l4 = 0–1000
e4 = 1–1000
a4+b4+c4+d4 =1–1999 and, more usually, 1–1000
k4+l4 =1–1999 and, more usually, 1–1000
a4+b4+c4+d4+k4+l4 =2–2000 and, more usually, 2–1000

$$\frac{k4 + l4}{a4 + b4 + c4 + d4} = 0.01-100$$

$$\frac{e4}{a4 - b4 - c4 - d4 - k4 - l4} = 0.01-0.5$$

In the products of formulae (I), (II), (III), (IV) and (V) the values of the indexes refer to the individual molecules which are present in the mixtures of polymer molecules. In these mixtures, said indexes take average values which can be integers or intermediate values between zero and one or between an integer and the successive integer. The ratios between the indexes apply both to the individual molecules and to the mixtures of polymer molecules.

In formulae (I), (II), (III), (IV) and (V), the units (O) are oxygen atoms of peroxidic nature and the perfluoroalkylenoxy units and the (O) units are statistically distributed within the chain.

The term "oxygen atom of peroxidic nature" denotes an oxygen atom bound to an oxygen of any of the perfluorcalkylenoxy units, thereby forming a peroxide group —O—O—.

The end groups A and B, the same or different from each other, reperesent the following radicals: $WCF_2-$, $WCF_2-CF_2-$, $CF_3-CFW-CF_2-$, $CF_3-CF_2-CFW-$, $-CFO$, $-CF_2CFO$ and  —CF—CFO,
       |
       CF₃ wherein W represents a fragment derived from the initiator(s) and/or the solvent molecule. Generally, W is F, Cl or a perfluoroalkyl or perfluoroalkoxy group optionally containing one or more heteroatoms. When the initiator contains two O—F bonds, a fragment thereof can bind to two growing polymer molecules, thereby becoming incorporated in the molecular chain of the perfluoropolyether product.

Consequently, the nature of the end groups varies from product to product, depending on the nature of the initiator(s) (solvent), on the nature of the monomer or monomers and on the process conditions.

Various parameters permit to influence the molecular weight and the structural composition of the products obtained. For instance, by increasing the concentration of the monomer or monomers in the liquid phase, an increase in the molecular weight may be obtained. Especially when the monomer is perfluoropropene or the monomer mixture contains perfluoropropene and/or when the temperature is increased, the molecular weight decreases.

By reducing the ratio initiator(s)/perfluoroolefin(s), the product molecular weight can, usually, be increased.

The process according to the present invention can be conducted in the presence of ultraviolet radiation in conventional manner.

On the basis of the results described in example IIa of the previously mentioned U.S. Pat. No. 4,460,514, it could not be expected that, by reacting perfluoroolefins with oxygen in the liquid phase in the presence of, for example, $CF_3OF$, it would be possible to obtain, with high yields and with a generally very reduced formation of by-products, peroxidic perfluoropolyethers comprising perfluoroalkylenoxy units having at least two carbon atoms and having a very low ratio of —COF end groups to non-functional end groups.

The main advantages of the present invention are:
Use is made of a chemical initiator instead of delicate and complex photochemical technologies;
The process is very flexible, allowing a wide range of products with different structural characteristics to be obtained by changing the process parameters (conditions).

The following examples merely serve to illustrate the invention and do not limit its scope in any way.

EXAMPLE 1

A total of 200 g of perfluoropropylene was condensed in a 500 ml glass reactor equipped with stirrer, thermometer, cooler with a liquid at $-78°$ C. connected to the atmosphere and gas feeding pipes reaching the reactor bottom. Subsequently, while maintaining external cooling so as to keep the internal temperature at $-48°$ C., an anhydrous oxygen stream of 2 Nl/h and a stream of 2.7 Nl/h of $CF_3OF$ and 0.14 Nl/h of $F_2$, diluted with 5 Nl/h of nitrogen, were separately bubbled into the liquid phase over 2.5 hours.

At the end of the reaction the unreacted perfluoropropylene and the reaction products having a boiling point of lower than 30° C. were distilled and removed from the reactor in an anhydrous nitrogen stream.

A total of 80 g of crude reaction product having the appearance of a colourless, transparent and viscous oil was obtained. The crude product, examined by means of infrared spectroscopy, exhibited a band in the region of 5.25 $\mu$m due to the presence of end groups —COF.

The crude product obtained, subjected to iodometric analysis, exhibited a content of active oxygen (i.e., of peroxidic oxygen) of 0.53 percent by weight.

The $^{19}$F-N M.R. analysis revealed that the products was a perfluoropolyether containing peroxidic groups (—O—O—) and having the general formula:

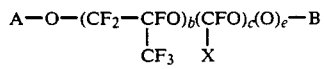

wherein:

$X = F$ or $CF_3$

A and B represent end groups —COF, —CF3, —CF$_2$CF$_3$, —$_{CF2}$CF$_2$CF$_3$ and —CF(CF$_3$)$_2$ in a molar ratio: COF/CF$_3$ +CF$_2$CF$_3$ +CF$_2$CF$_2$CF$_3$ +CF(CF$_3$)$_2$ =1:4.5 and a ratio: c/b = 0.027:1. The number average molecular weight was 2400.

EXAMPLES 2 to 6

By employing the apparatus and the procedure of example 1, a series of tests was carried out, varying the intiator, the temperature, the flow rate of the initiator and of the inert gas ($N_2$).

In example 2, $CF_3OF$, diluted with nitrogen and, separately, oxygen were employed.

In example 3, $CF_3OF$ in admixture with oxygen and an inert diluent ($N_2$) was introduced.

In example 6, $CF_3OF$ in admixture with $F_2$, diluted with nitrogen and, separately, oxygen were fed.

Operative conditions and main data relating to the products obtained are reported in table 1.

The products obtained, examined by means of $^{19}$F-N.M.R spectroscopy, proved to contain the same structural units and the same end groups as the product of example 1, but in different ratios.

EXAMPLE 7

A stream of 0.5 Nl/h of n-C$_3$F$_7$OCF(CF$_3$)CF$_2$OF, diluted with 5 Nl/h of nitrogen, was introduced into a 500 ml reactor, maintained at a temperature of $-67°$ C. and containing 150 g of stirred $C_3F_6$ while, simultaneously, feeding 5 Nl/h of $O_2$ for 2 hours. At the end of the reaction, after removal of the volatile products and of the unreacted $C_3F_6$, 12 g of an oily product were obtained. The $^{19}$F-N.M.R. analysis revealed that the product was composed of peroxidic polyether chains of general formula:

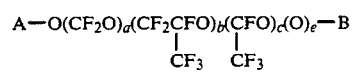

wherein A and B represent CF$_3$, CF$_2$CF$_2$CF$_3$ and CF(CF$_3$)$_2$, the ratio (a+c)/b =0.05. The number average molecular weight was 3600 and the active oxygen content equaled 0.65 percent by weight.

TABLE 1

| EXAMPLE NO. | 2 | 3 | 4 | 5 | 6 |
|---|---|---|---|---|---|
| Reactions Conditions | | | | | |
| Temperature (°C.) | −72 | −74 | −71 | −35 | −48 |
| Oxygen (Nl/h) | 2 | 2 | 2 | 2 | 2 |
| Elemental F$_2$ (Nl/h) | — | — | 0.5 | 0.5 | 0.05 |
| CF$_3$OF (Nl/h) | 1 | 1 | — | — | 0.95 |
| Nitrogen (Nl/h) | 3 | 3 | 10 | 10 | 3 |
| Perfluoropropylene (g) | 204 | 210 | 185 | 186 | 200 |
| Time (hours) | 4 | 4 | 3.5 | 0.4 | 6 |
| Peroxidic polyether products obtained (g) | 45 | 38 | 77 | 4.3 | 31.7 |
| Characteristics of the products obtained | | | | | |
| Number average molecular weight | 3200 | 4000 | 2600 | 2100 | 3000 |
| Active oxygen content $\left(\frac{\text{g of active oxygen}}{100 \text{ g of product}}\right)$ | 0.4 | 0.39 | 0.51 | 0.76 | 1.23 |

Average structure:

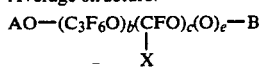

TABLE 1-continued

| EXAMPLE NO. | 2 | 3 | 4 | 5 | 6 |
|---|---|---|---|---|---|
| wherein X = F or CF$_3$ c/b | 0.003 | 0.003 | 0.002 | 0.043 | 0.02 |
| $\dfrac{\text{End groups } C_nF_{2n+1}}{\text{End groups } -COF}$ (molar ratio) | 13.2 | 10.2 | 30.8 | 6.5 | 6.2 |

EXAMPLE 8

Using the apparatus of example 1, maintained at $-71°$ C., 150 ml of perfluoroprophlene were condensed. Then a stream of 1.5 Nl/h of tetrafluoroethylene, a stream of 0.5 nl/h of elemental F$_2$, diluted with 2 Nl/h of nitrogen and, separately, a stream of 3 Nl/h of oxygen were bubbled through over a period of three hours.

At the end of the reaction 41.5 g of crude reaction product were recovered in the form of a colourless, transparent and viscous oil.

The crude product, subjected to iodometric analysis, exhibited an active oxygen content of 2.43 percent by weight and the $^{19}$F-N.M.R. spectrum corresponded to that of a peroxidic perfluoropolyether of general formula:

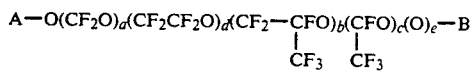

wherein A and B represent CF$_3$CF$_2$CF$_3$, CF$_2$CF$_2$CF$_3$CF(CF$_3$)$_2$ and COF in a molar ratio:

COF/CF$_3$+CF$_2$CF$_3$+CF$_2$CF$_2$CF$_3$+CF(CF$_3$)$_2$=0.076 b/d = 1.02
d/a = 35
b/a+c = 7.47
a+c/a+d+b+c = 0.06.

The product had a number average molecular weight of 2700.

EXAMPLE 9

Using the apparatus of example 1, maintained at $-71°$ C., 150 ml of dichlorodifluoromethane were condensed and, subsequently, there were introduced, by separately bubbling into the liquid solvent, a stream of 2.5 Nl/h of tetrafluoroethylene, a stream of 1.67 Nl/h of perfluorobutadiene and, separately, 7 Nl/h of oxygen, 0.47 Nl/h of trifluoromethyl hypofluorite and 1 Nl/h of nitrogen.

After 2 hours the introduction of reactants was discontinued and the solvent and the reaction products having a boiling point of lower than 30° C. were distilled in an anhydrous nitrogen stream. A total of 34 g of product was obtained. According to $^{19}$F-N.M.R. analysis, the product consisted of a perfluoropolyether containing peroxide groups (O—O) of general formula:

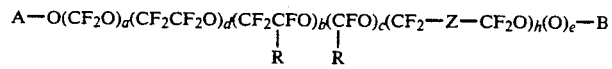

wherein R =

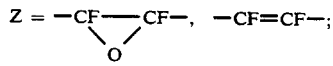, —COF, —CF=CF$_2$ and —CF$_2$—COF;

Z =

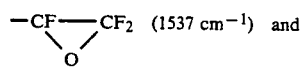, —CF=CF—;

A and B represent end groups —COF, —CF$_3$ and —CF$_2$CF$_3$ in a molar ratio COF/CF$_3$+CF$_2$CF$_3$ of 0.4; b/a equals 14.

(b+c+h)/(a+d)=0.2, the ratio d/a being equal to 14.

The number average molecular weight was 2500.

The IR-FT (Fourier Transform) spectrum confirmed the presence of groups

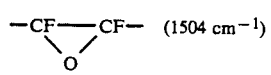 (1537 cm$^{-1}$) and

—CF——CF— (1504 cm$^{-1}$)
  \\ /
    O the former groups prevailing, and the presence of groups —CF=CF$_2$ (1785 cm$^{-1}$) and —CF=CF—(1719 cm$^{-1}$), the latter groups being predominant.

EXAMPLE 10

Using the apparatus of example 1, maintained at $-71°$ C., 150 ml of difluorodichloromethane were condensed and, subsequently, a stream of 3.5 Nl/h of perfluorobutadiene and a mixture of 11 Nl/h of oxygen, 0.7 Nl/h of trifluoromethyl hypofluorite and 2 Nl/h of nitrogen were introduced by bubbling through the liquid solvent.

After 2 hours the introduction of the reactants was stopped and the solvent and the reaction products having a boiling point of lower than 30° C. were distilled in an anhydrous nitrogen stream. A total of 35 g of product was obtained. According to the $^{19}$F-N.M.R. analysis the product consisted of perfluoropolyethers containing peroxide groups (—O—O—) of general formula:

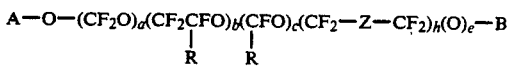

wherein

Z = 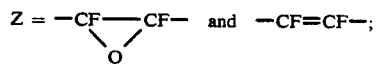 and —CF=CF—;

-continued

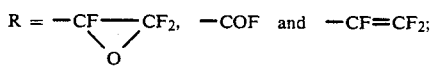

and A and B represent end groups CF$_3$, COF and CF$_2$COF.

The IR-FT spectrum confirmed the presence of groups

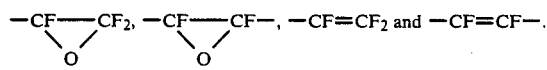

EXAMPLE 11

A total of 1.5 g of a mixture of products of average formula

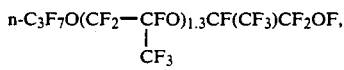

dissolved in 20 ml of CFCl$_3$, was gradually introduced into a 500 ml reactor, maintained at a temperature of $-70°$ C. and containing 150 g of stirred C$_3$F$_6$, with simultaneous feeding of 5 Nl/h of O$_2$, over a period of 2 hours. At the end of the reaction, after removal of the volatile products and of unreacted C$_3$F$_6$, 10.5 g of an oily product were obtained. The $^{19}$F-N.M.R. analysis revealed that it was composed of peroxidic polyether chains of general formula:

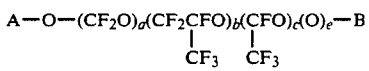

wherein A and B represent end groups —CF$_3$, —CF$_2$CF$_2$CF$_3$ and —CF(CF$_3$)$_2$, and (a+c)/b is 0.03. The number average molecular weight was 4200 and the active oxygen content was 0.06%.

EXAMPLE 12

A total of 400 g of C$_3$F$_6$ was introduced, at a temperature of $-60°$ C., into a cylindrical 300 ml glass reactor (optical path 0.5 cm), equipped with coaxial inner quartz sheath, two plunge pipes for feeding the gases, a sheath with termocouple for measuring the internal temperature and a reflux cooler maintained at a temperature of $-80°$ C.

Through the plunge pipes, 20 Nl/h of O$_2$ and 0.15 Nl/h of F$_2$ were separately bubbled into the reactor. By means of a refrigerating bath surrounding the reactor, the temperature of the reacting liquid phase was maintained at 60° C. throughout the entire course of the reaction.

Into the quartz sheath there was introduced an ultraviolet ray lamp, type HANAU TQ 150 (wavelength 200 to 600 nm), which was switched on simultaneously with the beginning of the gas feed and irradiation and feeding of the two reacting gases were continued for 2 hours.

The lamp was then switched off, the gases were discharged and the unreacted C$_3$F$_6$ was recovered from the reactor by evaporation at room temperature. Thus an oily polymeric residue (83.2 g) was obtained. The iodometric analysis of said residue indicated an active oxygen content of 0.25%. According to $^{19}$F-N.M.R. analysis the product consisted of peroxidic polyether chains having the general formula:

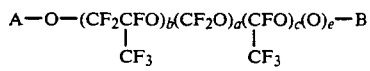

wherein A and B represent end groups —CF$_3$ and —COF and (a+c)/b is equal to 0.1. The product had a number average molecular weight of 5300.

EXAMPLE 13

Using the apparatus of example 1, maintained at $-71°$C., 150 ml of CF$_2$Cl$_2$ were condensed and then a stream of 2.5 Nl/h of C$_2$F$_4$ and a stream of 2.76 Nl/h of CF$_3$OCF=CF$_2$ were separately fed by bubbling into the liquid solvent.

After 5 minutes a stream consisting of 7 Nl/h of O$_2$, 0.35 Nl/h of CF$_3$OF and 1 Nl/h of N$_2$ was introduced without interrupting the monomer flow. After 2 hours the feeding of the reagents was stopped and the solvent and the reaction products having a boiling point lower than 30° C. were distilled in an anhydrous nitrogen stream. A total of 37 g of an oily product was obtained. According to $^{19}$F-N.M.R. analysis the product consisted of peroxidic polyether chains having the general formula:

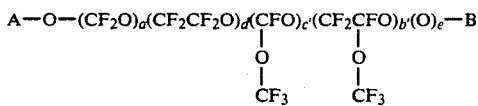

wherein A and B represent end groups —CF$_3$, —CF$_2$CF$_3$, —CF(OCF$_3$)CF$_3$, d/a equals 0.83, c'+b'/a+d equals 0.17 and c'/b' is 3.

The number average molecular weight of the product was 2300.

The iodometric analysis of the product indicated an active oxygen content of 1.26 percent by weight.

EXAMPLE 14

Using the apparatus of example 1, maintained at $-71°$ C., 88 g of C$_3$F$_6$ and 93 g of CF$_3$OCF=CF$_2$ were condensed and, subsequently, a stream of 3 Nl/h of O$_2$, 0.5 Nl/h of F$_2$ and 10 Nl/h of nitrogen was fed by bubbling into the liquid phase. After 3.5 hours the feeding of the reagents was stopped and the unreacted olefins and the reaction products having a boiling point lower than 30° C. were distilled in an anhydrous nitrogen stream. A total of 41 g of an oily product was obtained.

According to $^{19}$F-N.M.R. analysis the product was composed of polyperoxidic polyether chains of general formula:

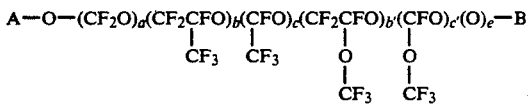

wherein A and B represent end groups CF$_3$, CF(OCF$_3$)CF$_3$, a+c/b=1, b'+c'/a+b+c=1.62 and b'/c'=8.75.

The number average molecular weight of the product was 5000.

The iodometric analysis of the product indicated an active oxygen content of 1.23 percent by weight.

EXAMPLE 15

As initiator, a perfluoropolyether product of formula $$A-C-(CF_2CF_2O)_m(CF_2O)_n-B$$

as described in example 3 of EP-A-308 905, wherein A and B are groups $CF_2OF$ (with a functionality of 1.65) and $CF_3$ was prepared. This product had a number average molecular weight of 2950.

A total of 1.1 g of said initiator was diluted with 20 g of $CFCl_3$ and introduced into a reactor maintained at a temperature of $-67°$ C. and containing 150 ml of stirred perfluoropropylene. Over a period of 2 hours 5 Nl/h or oxygen were introduced. At the end of the reaction, after removal of the volatile products and the unreacted perfluoropropylene by means of distillation, 2.5 g of a product were obtained which product, according to $^{19}F$-N.M.R. analysis was composed of peroxidic perfluoropolyethers of general formula:

$$A-O(CF_2O)_a(CF_2CF_2O)_d(CF_2CFO)_b(CFO)_c(O)_e-B$$
$$\quad\quad\quad\quad\quad\quad\quad\quad\quad\quad |\quad\quad\;\; |$$
$$\quad\quad\quad\quad\quad\quad\quad\quad\quad\;\; CF_3\;\;\; CF_3$$

wherein A and B are end groups $CF_3$, $CF_2CF_3$, $CF_2CF_2CF_3$ and $CF(CF_3)_2$, b/d is 0.63 and d/a+c is 0.69.

The number average molecular weight of the product was 7200.

The iodometric analysis revealed an active oxygen content of 0.3 percent by weight.

We claim:

1. A process for the preparation of peroxidic perfluoropolyethers comprising perfluoroalkylenoxy units having at least two carbon atoms, the process comprising reacting one or more perfluoroolefins, except tetrafluoroethylene used alone, are reacted with oxygen in the liquid phase at a temperature not exceeding 50° C. and in the presence of one or more compounds having one or more F—X bonds, in which X is selected from the group consisting of F, O and Cl, wherein the compounds having one or more F—O bonds are selected from organic compounds containing one or more fluoroxy groups.

2. The process according to claim 1, wherein the compounds having one or more F—O bonds are perhalogenated alkyl or alkylene compounds, the halogen atoms of which are F atoms or F and Cl atoms, containing one or more fluoroxy groups and, optionally, one or more heteroatoms.

3. The process according to claim 2, wherein the heteroatom or heteroatoms are ether oxygen atoms.

4. The process according to claim 2 wherein the perhalogenated alkyl or alkylene compound containing one or more fluoroxy groups and, optionally, one or more heteroatoms is a perfluorinated compound.

5. The process according to claim 2 wherein the perhalogenated alkyl or alkylene compound containing one or more fluoroxy groups and, optionally, one or more heteroatoms is a compound, the halogen atoms of which consist of F and Cl, in which the number of Cl atoms ranges from 1 to 10.

6. The process according to claim 3, wherein the number of ether oxygen atoms ranges from 1 to 100.

7. The process according to claim 6, wherein the number of ether oxygen atoms ranges from 1 to 10.

8. The process according to claim 1, wherein, when X is F, the compound having one or more F—X bonds is $F_2$.

9. The process according to claim 1, wherein, when X is Cl, the compound having one or more F—X bonds is a chlorine fluoride.

10. The process according to claim 1, wherein the compound or compounds having one or more F—X bonds are selected from the group consisting of:
1) $F_2$;
2) $R^5$—OF, wherein $R^5$ is a $C_{1-10}$—perhaloalkyl radical containing fluorine atoms or fluorine atoms and from 1 to 5 chlorine atoms;

$$3)\; R^6-O-(R^7O)_n(CF)_t-CF_2OF$$
$$\quad\quad\quad\quad\quad\quad\quad\quad\quad |$$
$$\quad\quad\quad\quad\quad\quad\quad\quad\quad D$$

wherein:

D represents F or $CF_3$;

t is zero or 1;

$R^6$ is a $C_{1-3}$—perfluoroalkyl radical or a $C_{1-3}$—perhaloalkyl radical containing fluorine atoms and one or more chlorine atoms;

$R^7$ represents one or more perfluoroalkylene radicals, the same or different from one another, selected from $$-CF_2-,\; -CF_2-CF_2-\;\; \text{and}\;\; -CF_2-CF-$$
$$\quad\quad\quad\quad\quad\quad\quad\quad\quad\quad\quad\quad\quad\quad |$$
$$\quad\quad\quad\quad\quad\quad\quad\quad\quad\quad\quad\quad\quad\quad CF_3$$

and n ranges from 0 to 50;

$$\quad\quad\quad\quad OF$$
$$\quad\quad\quad\quad\;\; |$$
$$4)\; R^8-C-R^9$$
$$\quad\quad\quad\quad\;\; |$$
$$\quad\quad\quad\quad OF$$

wherein $R^8$ is F or a $C_{1-9}$—perhaloalkyl radical containing F atoms or F atoms and from one to three Cl atoms; $R^9$ is F, $R^8$ or a perfluoroalkylmonoether or perfluoroalkylpolyether group $R^6O$—$(R^7O)_n$—$CF_2$—, in which $R^6$, $R^7$ and n are as defined above;

5) FO—$(R^7O)_s$—F wherein $R^7$ is as defined above and s ranges from 1 to 100, provided that, when $R^7$ represents —$CF_2$—, s has a value higher than 1;

6) FO—$(CF_2)_v$—OF, wherein v ranges from 3 to 5.

11. The process according to claim 1, wherein the prefluoroolefins are selected from the group consisting of:

(a) one or more perfluoromonoolefins, except $C_2F_4$, when used alone (b) a perfluorodiolefin (c) a perfluorodiolefin in combination with one or more perfluoromonoolefins (d) one or more perfluoromonoolefins in combination with one or more perfluorovinylethers.

12. The process according to claim 11, wherein the perfluoromonoolefins are selected from the group consisting of hexafluoropropene and of hexafluoropropene in admixture with tetrafluoroethylene.

13. The process according to claim 11, wherein the perfluorodiolefin is perfluorobutadiene.

14. The process according to claim 11, wherein the perfluorovinylethers have the general formula $CF_2=CF-O-R^2$ wherein:

$R^2$ is $(R^3O)_mR^4$ or $R^4$;

$R^3$ is selected from the group consisting of $-CF_2-$, $-CF_2-CF_2-$ and $$-CF_2-\underset{\underset{CF_3}{|}}{CF}-;$$

$R^4$ is a perfluoroalkyl group selected from linear groups containing from 1 to 10 carbon atoms, branched groups containing from 3 to 10 carbon atoms and cyclic groups containing from 3 to 6 carbon atoms, and m ranges from 1 to 6.

15. The process according to claim 14, wherein in the group $(R^3O)_mR^4$ m ranges from 1 to 3.

16. The process according to claim 14, wherein $R_4$ is selected from the $CF_3-$, $C_2F_5-$, $n-C_3F_7-$, $i-C_3F_7-$, $n-C_4F_9-$ and tert-$C_4F_9-$ radicals.

17. The process according to claim 1, further comprising introducing into a liquid phase comprising a solvent and/or one or more perfluoroolefins a gaseous stream of oxygen, a gaseous or liquid stream of one or more compounds having one or more F—X bonds and, optionally, a gaseous or liquid stream of one or more perfluoroolefins, the last-mentioned stream being always present if the liquid phase does not contain perfluoroolefins prior to the start of the reaction.

18. The process according to claim 1, further comprising feeding into a liquid phase comprising a solvent and/or one or more perfluoroolefins and containing one or more compounds having one or more F—X bonds, a stream of gaseous oxygen and, optionally, a gaseous or liquid stream of one or more perfluoroolefins, the latter stream being always present if the liquid phase does not contain perfluoroolefins prior to the start of the reaction.

19. The process according to claim 18 further comprising feeding, an inert gas into the liquid phase.

20. The process according to claim 1 the temperature ranges from $-120°$ to $+50°$ C.

21. The process according to claim 20, wherein the temperature ranges from $-100°$ to $+20°$ C.

22. The process according to claim 21, wherein the temperature ranges from $-100°$ to $0°$ C.

23. The process according to claim 17 wherein the solvent is selected from the group consisting of linear and cyclic fluorocarbons, chlorofluorocarbons, perfluoroamines, perfluorinated ethers and mixtures thereof.

24. The process according to claim 1 wherein the oxygen partial pressure in the reactor ranges from 0.01 to 10 atmospheres.

25. The process according to claim 24, wherein the oxygen partial pressure in the reactor ranges from 0.05 to 1 atmosphere.

26. The process according to claim 1 wherein the total pressure at which the reaction is conducted ranges from about 1 to about 10 atmospheres absolute.

27. The process according to claim 17, wherein, when a gaseous or liquid stream of one or more compounds having one or more F—X bonds is fed into the liquid phase, the flow rate of said compound(s) ranges from 0.001 to 5 moles per hour per liter of liquid phase.

28. The process according to claim 27, wherein the flow rate of the compound(s) having one or more F—X bonds ranges from 0.01 to 2 moles per hour per liter of liquid phase.

29. The process according to claim 18, wherein, when the liquid phase already contains compounds(s) having one or more F—X bonds prior to the start of the reaction, the molar ratio:

$$\frac{\text{compound(s) having one or more F-X bonds}}{\text{total of introduced perfluorooelfin(s)}}$$

ranges from 0.01 to 0.1

30. The process according to claim 19, wherein the inert gas is selected from the group consisting of nitrogen, argon, helium, $CF_4$, $C_2F_6$ and mixtures thereof.

31. The process according to claim 1 wherein the reaction is conducted in the presence of ultraviolet radiation.

32. Peroxidic perfluoropolyethers comprising perfluoroalkylenoxy units having at least two carbon atoms, obtainable by the process of claim 1.

* * * * *